(12) United States Patent
Fukumitsu et al.

(10) Patent No.: US 8,872,067 B2
(45) Date of Patent: Oct. 28, 2014

(54) LASER BEAM WORKING MACHINE

(75) Inventors: Kenshi Fukumitsu, Hamamatsu (JP);
Shingo Oishi, Hamamatsu (JP);
Shinichiro Aoshima, Hamamatsu (JP);
Atsuko Aoshima, legal representative, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 331 days.

(21) Appl. No.: 13/143,636

(22) PCT Filed: Dec. 4, 2009

(86) PCT No.: PCT/JP2009/070413
§ 371 (c)(1),
(2), (4) Date: Sep. 21, 2011

(87) PCT Pub. No.: WO2010/079659
PCT Pub. Date: Jul. 15, 2010

(65) Prior Publication Data
US 2012/0006797 A1    Jan. 12, 2012

(30) Foreign Application Priority Data
Jan. 9, 2009  (JP) .................................. 2009-004064

(51) Int. Cl.
*B23K 26/08*  (2014.01)
*B23K 26/073*  (2006.01)

(52) U.S. Cl.
CPC .............. *B23K 26/0732* (2013.01); *B23K 26/08* (2013.01); *B23K 226/073* (2013.01); *B23K 26/0738* (2013.01)
USPC ..................... 219/121.78; 219/121.68; 372/24

(58) Field of Classification Search
USPC ............. 219/121.61–121.73, 121.75, 121.85; 372/24
See application file for complete search history.

(56) References Cited

U.S. PATENT DOCUMENTS 4,546,231 A    10/1985  Gresser et al.
5,622,540 A    4/1997   Stevens
(Continued)

FOREIGN PATENT DOCUMENTS

CN    1160228 A    9/1997
CN    2454077 Y    10/2001
(Continued)

OTHER PUBLICATIONS

Shizuoka University, Hamamatsu Photonics K.K., OS. Miyake, S. Oishi, S. Aoshima and Y. Kawata, "Control of the shape of microvoids and cracks by using an aperture at pupil plane," The proceedings of JSAP 68$^{th}$ Autumn meeting 2007 at Hokkaido Institute of Technology, including English translation.
(Continued)

*Primary Examiner* — Samuel M Heinrich
(74) *Attorney, Agent, or Firm* — Drinker Biddle & Reath LLP

(57) ABSTRACT

A cylindrical lens (4) diverges a laser beam (L1) in the Y-axis direction (i.e., within the YZ plane) but neither diverges nor converges it in the X-axis direction (i.e., within the ZX plane). An objective lens (5) converges the laser beam (L1) emitted from the cylindrical lens (4) into a point P1 in the Y-axis direction and into a point P2 in the X-axis direction. A pair of knife edges (13) adjust the divergence angle (θ) of the laser beam (L1) incident on the objective lens (5) in the Y-axis direction. As a consequence, the cross section of the laser beam (L1) becomes an elongated form extending in the Y-axis direction at the point P2, while the maximum length in the Y-axis direction is regulated. Therefore, locating the point P2 on the front face of a work (S) can form an elongated working area extending in the Y-axis direction by a desirable length on the front face of the work (S).

8 Claims, 8 Drawing Sheets

(56) References Cited

U.S. PATENT DOCUMENTS

| | | | |
|---|---|---|---|
| 5,637,244 A * | 6/1997 | Erokhin | 219/121.69 |
| 6,992,026 B2 | 1/2006 | Fukuyo et al. | |
| 7,009,630 B1 | 3/2006 | Finger et al. | |
| 7,119,886 B2 | 10/2006 | Leenders et al. | |
| 7,396,742 B2 | 7/2008 | Fukuyo et al. | |
| 7,489,454 B2 | 2/2009 | Fukuyo et al. | |
| 7,547,613 B2 | 6/2009 | Fukuyo et al. | |
| 7,566,635 B2 | 7/2009 | Fujii et al. | |
| 7,592,237 B2 | 9/2009 | Sakamoto et al. | |
| 7,592,238 B2 | 9/2009 | Fukuyo et al. | |
| 7,605,344 B2 | 10/2009 | Fukumitsu | |
| 7,608,214 B2 | 10/2009 | Kuno et al. | |
| 7,615,721 B2 | 11/2009 | Fukuyo et al. | |
| 7,626,137 B2 | 12/2009 | Fukuyo et al. | |
| 7,709,767 B2 | 5/2010 | Sakamoto | |
| 7,718,510 B2 | 5/2010 | Sakamoto et al. | |
| 7,719,017 B2 | 5/2010 | Tanaka | |
| 7,732,730 B2 | 6/2010 | Fukuyo et al. | |
| 7,749,867 B2 | 7/2010 | Fukuyo et al. | |
| 7,754,583 B2 | 7/2010 | Sakamoto | |
| 7,825,350 B2 | 11/2010 | Fukuyo et al. | |
| 7,897,487 B2 | 3/2011 | Sugiura et al. | |
| 7,902,636 B2 | 3/2011 | Sugiura et al. | |
| 7,939,430 B2 | 5/2011 | Sakamoto et al. | |
| 7,947,574 B2 | 5/2011 | Sakamoto et al. | |
| 8,138,450 B2 | 3/2012 | Sakamoto et al. | |
| 2002/0001082 A1 * | 1/2002 | Akimoto et al. | 356/400 |
| 2004/0002199 A1 | 1/2004 | Fukuyo et al. | |
| 2005/0202596 A1 | 9/2005 | Fukuyo et al. | |
| 2005/0272223 A1 | 12/2005 | Fujii et al. | |
| 2006/0011593 A1 | 1/2006 | Fukuyo et al. | |
| 2006/0144828 A1 | 7/2006 | Fukumitsu et al. | |
| 2006/0148212 A1 | 7/2006 | Fukuyo et al. | |
| 2006/0255024 A1 | 11/2006 | Fukuyo et al. | |
| 2006/0266744 A1 | 11/2006 | Nomaru | |
| 2007/0085099 A1 | 4/2007 | Fukumitsu et al. | |
| 2007/0125757 A1 | 6/2007 | Fukuyo et al. | |
| 2007/0158314 A1 | 7/2007 | Fukumitsu et al. | |
| 2007/0252154 A1 | 11/2007 | Uchiyama et al. | |
| 2008/0035611 A1 | 2/2008 | Kuno et al. | |
| 2008/0037003 A1 | 2/2008 | Atsumi et al. | |
| 2008/0090382 A1 | 4/2008 | Fujii et al. | |
| 2008/0218735 A1 | 9/2008 | Atsumi et al. | |
| 2008/0251506 A1 | 10/2008 | Atsumi et al. | |
| 2009/0008373 A1 | 1/2009 | Muramatsu et al. | |
| 2009/0032509 A1 | 2/2009 | Kuno et al. | |
| 2009/0098713 A1 | 4/2009 | Sakamoto | |
| 2009/0107967 A1 | 4/2009 | Sakamoto et al. | |
| 2009/0117712 A1 | 5/2009 | Sakamoto et al. | |
| 2009/0166342 A1 | 7/2009 | Kuno et al. | |
| 2009/0166808 A1 | 7/2009 | Sakamoto et al. | |
| 2009/0250446 A1 | 10/2009 | Sakamoto | |
| 2009/0261083 A1 | 10/2009 | Osajima et al. | |
| 2009/0302428 A1 | 12/2009 | Sakamoto et al. | |
| 2010/0006548 A1 | 1/2010 | Atsumi et al. | |
| 2010/0009547 A1 | 1/2010 | Sakamoto | |
| 2010/0012632 A1 | 1/2010 | Sakamoto | |
| 2010/0012633 A1 | 1/2010 | Atsumi et al. | |
| 2010/0015783 A1 | 1/2010 | Fukuyo et al. | |
| 2010/0025386 A1 | 2/2010 | Kuno et al. | |
| 2010/0032418 A1 | 2/2010 | Kuno et al. | |
| 2010/0055876 A1 | 3/2010 | Fukuyo et al. | |
| 2010/0151202 A1 | 6/2010 | Fukumitsu | |
| 2010/0176100 A1 | 7/2010 | Fukuyo et al. | |
| 2010/0184271 A1 | 7/2010 | Sugiura et al. | |
| 2010/0200550 A1 | 8/2010 | Kumagai | |
| 2010/0203678 A1 | 8/2010 | Fukumitsu et al. | |
| 2010/0203707 A1 | 8/2010 | Fujii et al. | |
| 2010/0227453 A1 | 9/2010 | Sakamoto | |
| 2010/0240159 A1 | 9/2010 | Kumagai et al. | |
| 2010/0258539 A1 | 10/2010 | Sakamoto | |
| 2010/0301521 A1 | 12/2010 | Uchiyama | |
| 2010/0311313 A1 | 12/2010 | Uchiyama | |
| 2010/0327416 A1 | 12/2010 | Fukumitsu | |
| 2011/0000897 A1 | 1/2011 | Nakano et al. | |
| 2011/0001220 A1 | 1/2011 | Sugiura et al. | |
| 2011/0021004 A1 | 1/2011 | Fukuyo et al. | |
| 2011/0027971 A1 | 2/2011 | Fukuyo et al. | |
| 2011/0027972 A1 | 2/2011 | Fukuyo et al. | |
| 2011/0037149 A1 | 2/2011 | Fukuyo et al. | |
| 2011/0274128 A1 | 11/2011 | Fukumitsu et al. | |

FOREIGN PATENT DOCUMENTS

| | | |
|---|---|---|
| CN | 1407607 | 4/2003 |
| CN | 101314197 | 12/2008 |
| JP | 10-506087 | 6/1998 |
| JP | 2007-931 | 1/2007 |
| JP | 2007-000931 | 1/2007 |
| JP | 2007-75886 | 3/2007 |
| JP | 2007-075886 | 3/2007 |
| JP | 2008-296254 | 12/2008 |
| JP | 2009-56467 | 3/2009 |
| WO | WO 2008/044394 | 4/2008 |

OTHER PUBLICATIONS

X. Liu et al., "Laser Ablation and Micromachining with Ultrashort Laser Pulses," IEEE Journal of Quantum Electronics, vol. 33, No. 10, Oct. 1997, pp. 1706-1716.
U.S. Appl. No. 13/206,181, filed Aug. 9, 2011.
U.S. Appl. No. 13/269,274, filed Oct. 7, 2011.
U.S. Appl. No. 13/235,936, filed Sep. 19, 2011.
U.S. Appl. No. 13/213,175, filed Aug. 19, 2011.
U.S. Appl. No. 13/233,662, filed Sep. 15, 2011.
U.S. Appl. No. 13/061,438, filed Apr. 26, 2011.
U.S. Appl. No. 13/107,056, filed May 13, 2011.
U.S. Appl. No. 13/151,877, filed Jun. 2, 2011.
U.S. Appl. No. 13/131,429, filed Jun. 28, 2011.
U.S. Appl. No. 13/148,097, filed Aug. 26, 2011.
U.S. Appl. No. 13/262,995, filed Oct. 5, 2011.
U.S. Appl. No. 13/265,027, filed Oct. 18, 2011.

* cited by examiner (a)

(b)

(a)

(b)

(c)

(a)

(b)

LASER BEAM WORKING MACHINE

TECHNICAL FIELD

The present invention relates to a laser beam working machine.

BACKGROUND ART

Known as a conventional laser beam working machine is one which irradiates a work with a laser beam such that the laser beam has an intensity exceeding a working threshold while its cross section at a converging point becomes an elongated form such as an ellipse (see, for example, Patent Literatures 1 and 2).

CITATION LIST

Patent Literature

Patent Literature 1: Japanese Unexamined Patent Application (Translation of PCT Application) No. 10-506087
Patent Literature 2: Japanese Patent Application Laid-Open No. 2007-75886

SUMMARY OF INVENTION

Technical Problem

The laser beam working machine such as the one mentioned above can form a work with a one-dimensionally extending working area and thus is very effective and expected to undergo further technical development.

In view of such circumstances, it is an object of the present invention to provide a laser beam working machine which can form a working area into a desirable shape.

Solution to Problem

For achieving the above-mentioned object, the laser beam working machine in accordance with the present invention comprises a laser light source for emitting a laser beam; a support table for supporting a work; a first optical system, having a function to diverge or converge parallel light in a predetermined direction orthogonal to an optical axis, for diverging or converging the laser beam emitted from the laser light source in the predetermined direction; a second optical system, having a function to converge parallel light into one point on the optical axis, for converging the laser beam emitted from the first optical system into a first point in a first direction orthogonal to the optical axis and a second point in a second direction orthogonal to the optical axis and first direction; an adjustment mechanism for adjusting a divergence or convergence angle of the laser beam incident on the second optical system at least in the first direction; and a moving mechanism for moving the support table relative to the second optical system along the optical axis such that at least the second point is located on an outer surface of the work or therewithin.

In this laser beam working machine, while the cross section of the laser beam becomes elongated forms extending in the second and first directions at the first and second points, respectively, the divergence or convergence angle of the laser beam incident on the second optical system is adjusted at least in the first direction, whereby the length in the first direction of the cross-sectional form of the laser beam is adjusted at least at the second point. Therefore, when at least the second point is located on the outer surface of the work or therewithin by the moving mechanism, an elongated working area extending in the first direction by a desirable length can be formed in a portion where the second point is located on the outer surface of the work or therewithin. Hence, this laser beam working machine can form the working area into a desirable shape.

Preferably, when the work is adapted to absorb the laser beam, the moving mechanism moves the support table relative to the second optical system along the optical axis such that the second point is located on the outer surface of the work. In this case, a working area can reliably be formed in a portion where the second point is located on the outer surface of the work. Preferably, when the work is adapted to transmit the laser beam therethrough, the moving mechanism moves the support table relative to the second optical system along the optical axis such that the first and second points are located on the outside of the work and on the outer surface of the work or therewithin, respectively. In this case, a working area can reliably be formed in a portion where the second point is located on the outer surface of the work or therewithin.

Preferably, the moving mechanism moves the support table relative to the second optical system in the first direction. In this case, the working area becomes an elongated form extending in the first direction, whereby the working area can be formed efficiently on the outer surface of the work or therewithin along a working line parallel to the first direction. Preferably, the moving mechanism moves the support table relative to the second optical system in the second direction. In this case, the working area becomes an elongated form extending in the first direction, whereby a wide working area can be formed on the outer surface of the work or therewithin along a working line perpendicular to the first direction.

Preferably, an optical member reflecting the laser beam is disposed on the optical axis between the first and second optical systems, while the optical member transmits therethrough an observation beam for observing the work. This structure makes it possible to observe the work through the second optical system having a function to converge parallel light into one point on the optical axis without being affected by the first optical system.

Preferably, the adjustment mechanism is a slit for changing a width of the laser beam in the first direction by varying a gap in the first direction on an optical path between the first and second optical systems or an optical system for changing the width of the laser beam in the first direction on an optical path between the laser light source and first optical system.

Advantageous Effects of Invention

The present invention makes it possible to form a working area into a desirable shape.

DESCRIPTION OF EMBODIMENTS

Figure 1:
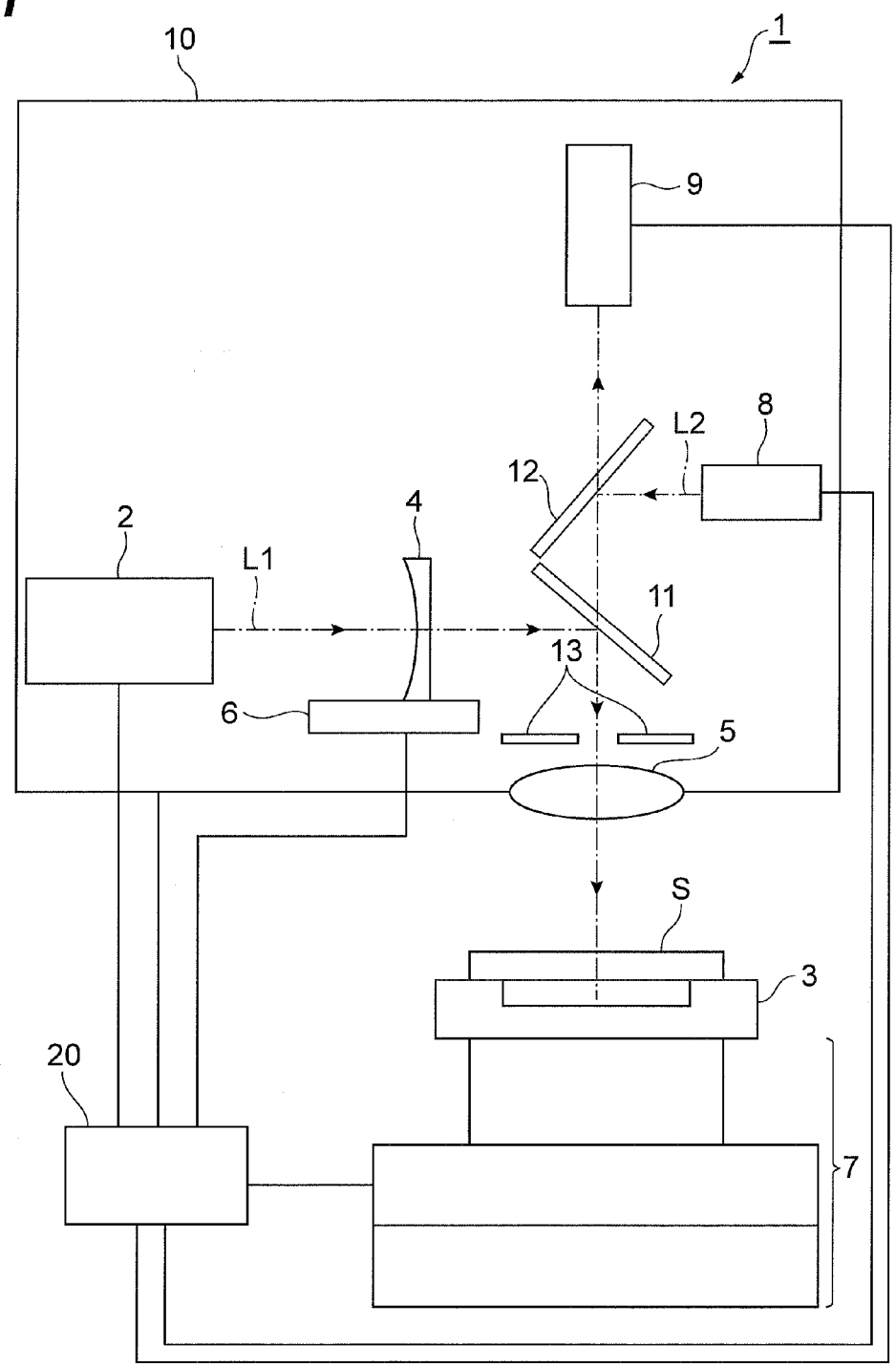
[FIG. 1] is a structural diagram of one embodiment of the laser beam working machine in accordance with the present invention.

In the following, preferred embodiments of the present invention will be explained in detail. In the drawings, the same or equivalent constituents will be referred to with the same signs while omitting their overlapping descriptions.

FIG. 1 is a structural diagram of one embodiment of the laser beam working machine in accordance with the present invention. As illustrated in FIG. 1, the laser beam working machine 1 comprises a laser oscillator (laser light source) 2 for emitting a laser beam L1, a support table 3 for supporting a work S which is adapted to absorb the laser beam L1, a cylindrical lens (first optical system) 4 having a function to diverge parallel light in a predetermined direction orthogonal to an optical axis by a cylindrical concave surface, an objective lens (second optical system) 5 having a function to converge parallel light into one point on the optical axis, a pair of knife edges (adjustment mechanism) 13 for adjusting the divergence angle of the laser beam L1 incident on the objective lens 5, a moving mechanism 6 for moving the cylindrical lens 4 along its optical axis, and an XYZ stage (moving mechanism) 7 for moving the support table 3 along the optical axis of the objective lens 5. The XYZ stage 7 moves the support table 3 not only along the optical axis of the objective lens 5, i.e., Z axis, but also along the X axis orthogonal to the Z axis as well as the Y axis orthogonal to the Z and X axes.

The laser beam working machine 1 further comprises an illumination unit 8 for projecting an observation beam L2 for observing the work S and an imaging unit 9 for acquiring an image of the work S by receiving reflected light of the observation beam L2 from the work S. This makes it possible to observe the front face, inside, or rear face of the work S.

In the laser beam working machine 1, the laser beam L1 emitted from the laser oscillator 2 advances on the optical axis of the cylindrical lens 4, then is reflected by a dichroic mirror (optical member) 11 and, with its divergence angle adjusted by the knife edges 13, proceeds on the optical axis of the objective lens 5, thereby irradiating the work S on the support table 3. On the other hand, the observation beam L2 projected by the illumination unit 8 is reflected by the dichroic mirror 12 and then transmitted through the dichroic mirror 11, so as to advance on the optical axis of the objective lens 5, thereby irradiating the work S on the support table 3. The reflected light of the observation beam L2 from the work S advances on the optical axis of the objective lens 5 and passes through the dichroic mirrors 11, 12, so as to be received by the imaging unit 9.

In the laser beam working machine 1, the laser oscillator 2, cylindrical lens 4, objective lens 5, moving mechanism 6, illumination unit 8, imaging unit 9, and dichroic mirrors 11, 12 are disposed within a housing, so as to construct a laser irradiation device 10. The laser beam working machine 1 is also equipped with a control unit 20 for controlling the whole machine including the laser oscillator 2, moving mechanism 6, illumination unit 8, imaging unit 9, and XYZ stage 7. The control unit 20 regulates the moving mechanism 6 in order to move the cylindrical lens 4 relative to the objective lens 5 along the optical axis and controls the XYZ stage 7 in order to move the support table 3 (i.e., the work S) relative to the objective lens 5 along the optical axis. The distance between the objective lens 5 and support table 3 (i.e., the distance between the objective lens 5 and work S) may be adjusted by moving the support table 3 along the Z axis (along the optical axis), the objective lens 5 or the laser irradiation device 10 including the objective lens 5 along the Z axis, or both of them. The control unit 20 further regulates the laser oscillator 2 and illumination unit 8 and operates the XYZ stage 7 according to the image acquired by the imaging unit 9, so as to adjust the focal position of the laser beam L1 with respect to the work S.

Figure 2:
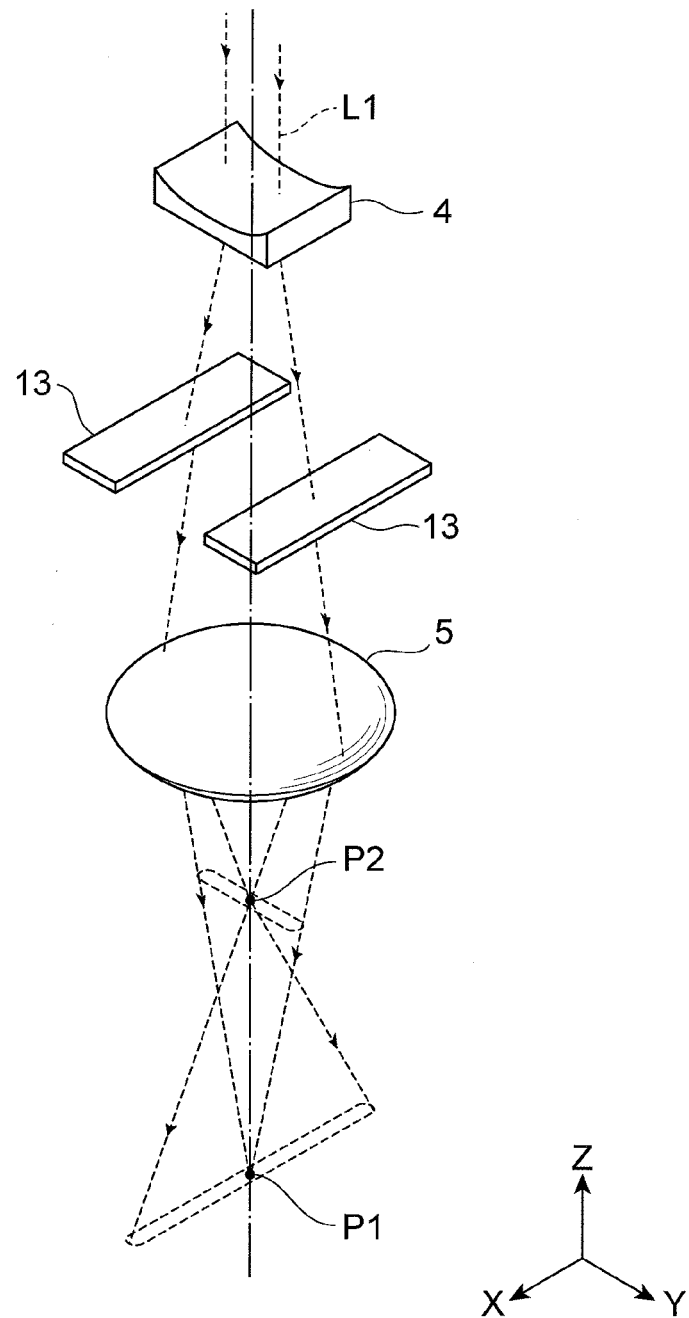
[FIG. 2] is a diagram illustrating an optical path of a laser beam in the laser beam working machine of FIG. 1.
Figure 3:
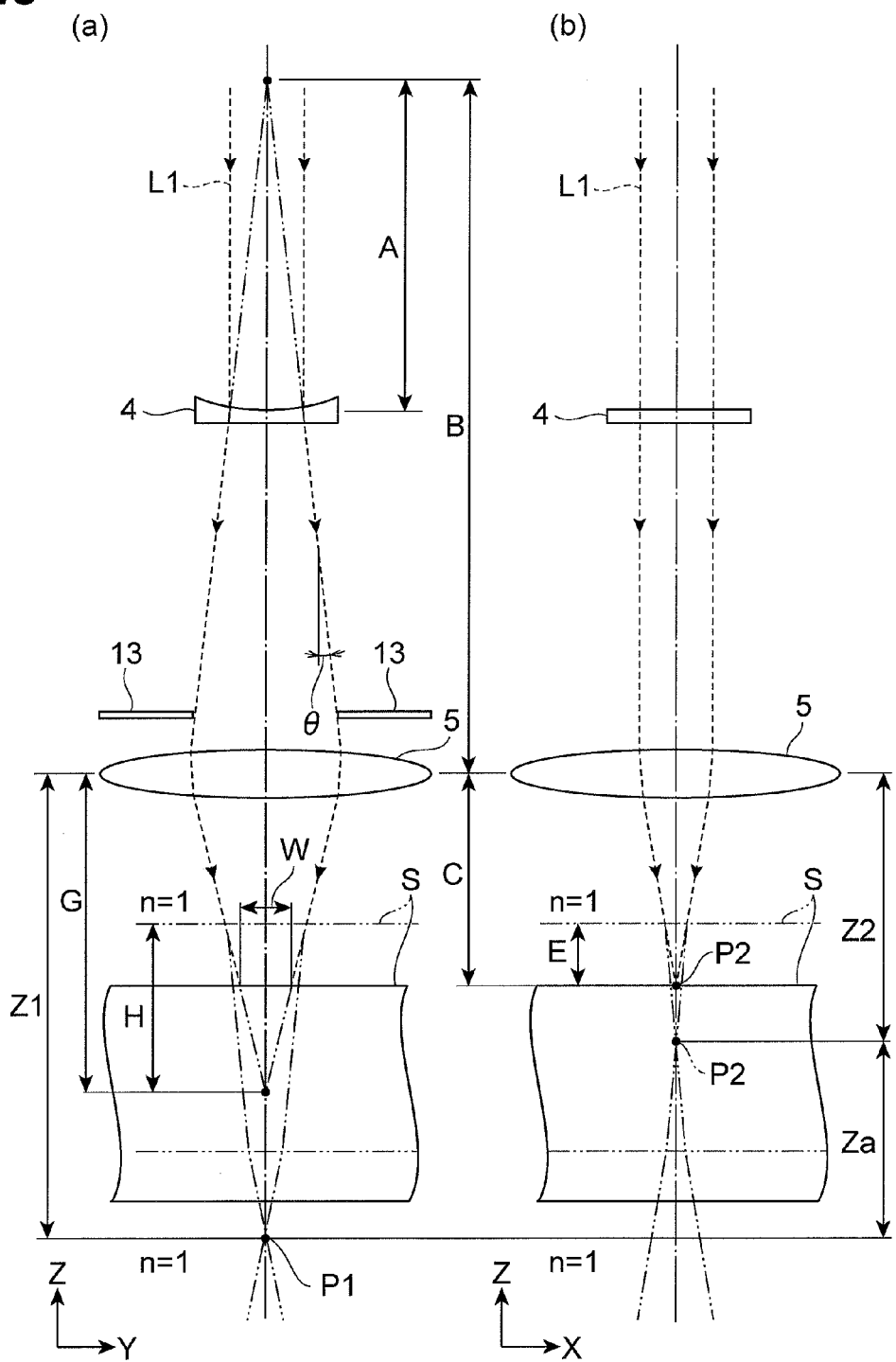
[FIG. 3] is a diagram illustrating the optical path of the laser beam in the laser beam working machine of FIG. 1.
Figure 4:
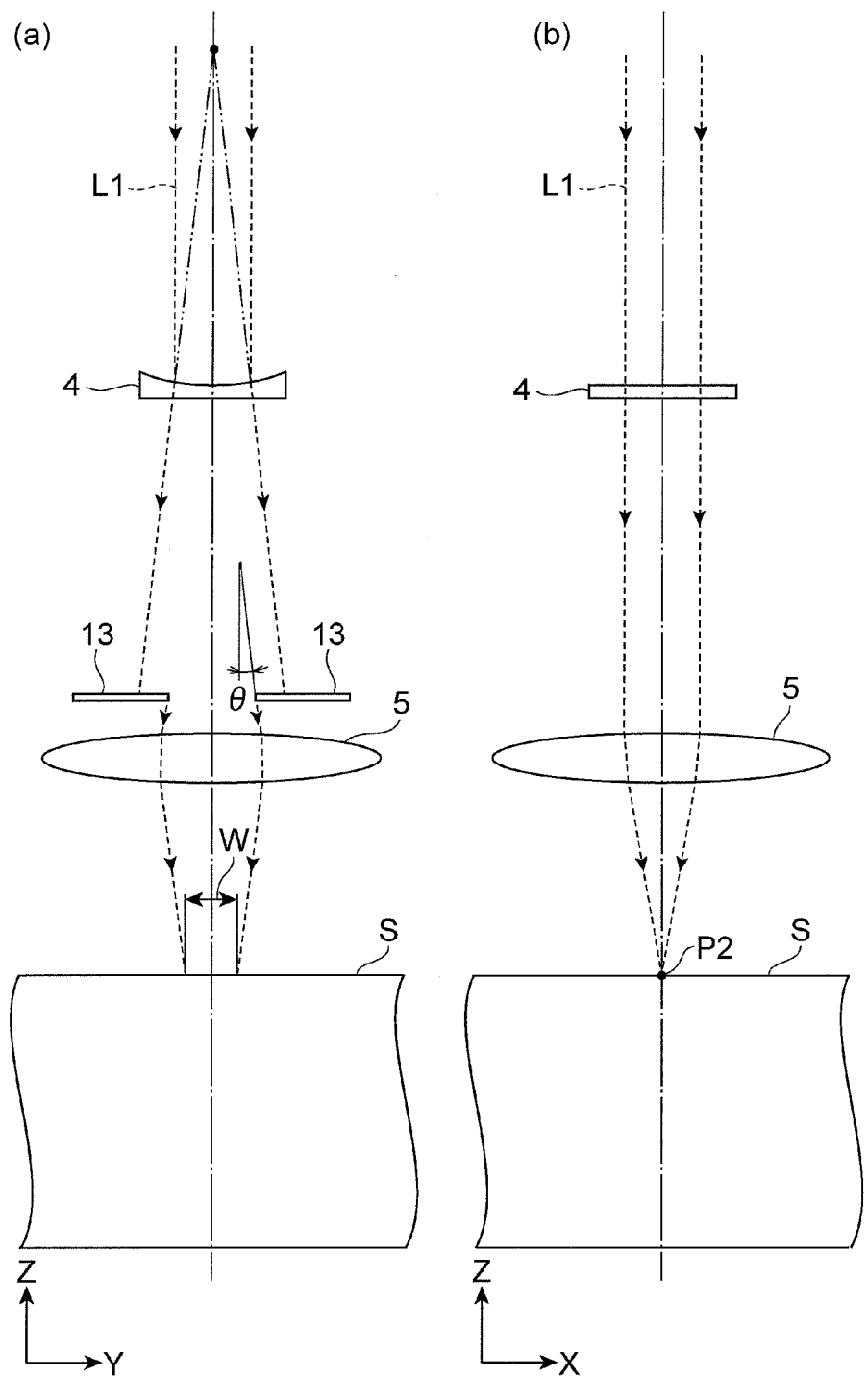
[FIG. 4] is a diagram illustrating the optical path of the laser beam in the laser beam working machine of FIG. 1.

FIGS. 2 to 4 are diagrams illustrating the optical path of the laser beam in the laser beam working machine of FIG. 1. FIGS. 2 to 4 do not depict the dichroic mirror 11 for convenience of explanation. FIG. 3 also depicts the optical path of the laser beam L1 (dash-double-dot lines in the drawing) assuming that the laser beam L1 is transmitted through the work S and the work S at that time (dash-double-dot lines in the drawing). As illustrated in FIGS. 2 to 4, the cylindrical lens 4 diverges the laser beam L1 emitted from the laser oscillator 2 in the Y-axis direction (a predetermined direction; i.e., within the YZ plane) but neither diverges nor converges it in the X-axis direction (i.e., within the ZX plane). The objective lens 5 converges the laser beam L1 emitted from the cylindrical lens 4 into a first point P1 in the Y-axis direction (first direction; i.e., within the YZ plane) and into a second point P2 in the X-axis direction (second direction; i.e., within the ZX plane). As a consequence, the cross section of the laser beam L1 becomes elongated forms extending in the X- and Y-axis directions at the points P1, P2, respectively.

A pair of knife edges (defining a slit) 13 are adapted to advance and retract with respect to the optical axis of the objective lens 5 from both sides thereof along the Y axis, thereby adjusting the slit width between the pair of knife edges 13, 13. That is, in the Y-axis direction, the knife edges 13 adjust the divergence angle θ of the laser beam L1 incident on the objective lens 5. Hence, they make the width of the laser beam variable in the Y-axis direction by regulating the slit width. In other words, the knife edges 13 adjust the numerical aperture (NA) of the laser beam L1 incident on the objective lens 5 in the Y-axis direction.

Here, letting A be the focal length of the cylindrical lens 4, B the divergence length (the distance between the focal point of the cylindrical lens 4 and the principal point of the objective lens 5), C the focal length of the objective lens 5, n the refractive index of the work S, and d the thickness of the work S as illustrated in FIG. 3, the convergence length (the distance between the principal point of the objective lens 5 and the first point P1) Z1 within the YZ plane and the convergence length (the distance between the principal point of the objective lens 5 and the second point P2) Z2 within the ZX plane are represented respectively by the following expressions (1) and (2):

$$Z1 = (G-H) + d + (nH-d)/n \quad (1)$$

$$Z2 = (C-E) + nE \quad (2)$$

In expressions (1) and (2), $G = 1/((1/C)-(1/B))$, H is the distance between the front face of the work S and a converging point (the converging point of the laser beam L1 within the YZ plane) in the case where n=1, and E is the distance between the front face of the work S and a converging point (the converging point of the laser beam L1 within the ZX plane) in the case where n=1. In the air above the work S (i.e., between the work S and objective lens 5) and therebelow, n=1.

Letting the numerical aperture (NA) of the laser beam L1 incident on the objective lens 5 be J (=n·sin θ), the maximum length W in the Y-axis direction of the cross-sectional form of the laser beam L1 at the second point P2 is represented by the following expression (3):

$$W=2CG \cdot \sin^{-1} J/(C+G) \quad (3)$$

It is seen from the above-mentioned expressions (1) and (2) that the convergence length Z1 within the YZ plane depends on the divergence length B and that the convergence length Z2 within the ZX plane does not depend on the divergence length B. That is, when the cylindrical lens 4 is moved back and forth along the optical axis by the moving mechanism 6, the convergence length Z1 within the YZ plane and, consequently, the astigmatic difference Za (=Z1−Z2) change, while the convergence length Z2 within the ZX plane is unchanged.

While the cross section of the laser beam L1 becomes elongated forms extending in the X- and Y-axis directions at the first and second points P1, P2, respectively, as mentioned above, it is also seen from the above-mentioned expression (3) that the maximum length W in the Y-axis direction of the cross-sectional form of the laser beam L1 at the second point P2 is regulated when the divergence angle θ of the laser beam L1 incident on the objective lens 5 is adjusted by the knife edges 13.

Figure 5:
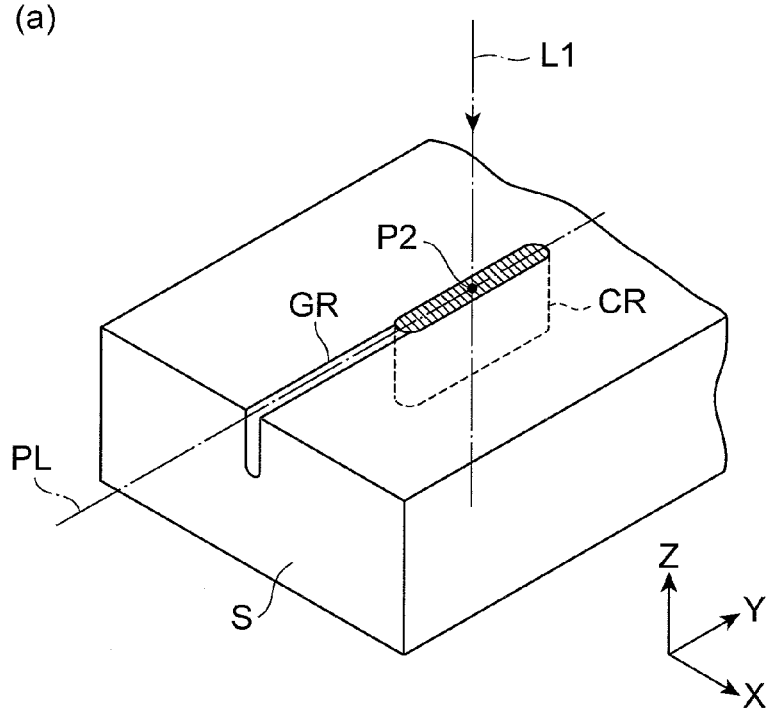
[FIG. 5] is a view illustrating the work formed with the working area by the laser beam working machine of FIG. 1.
Figure 5:
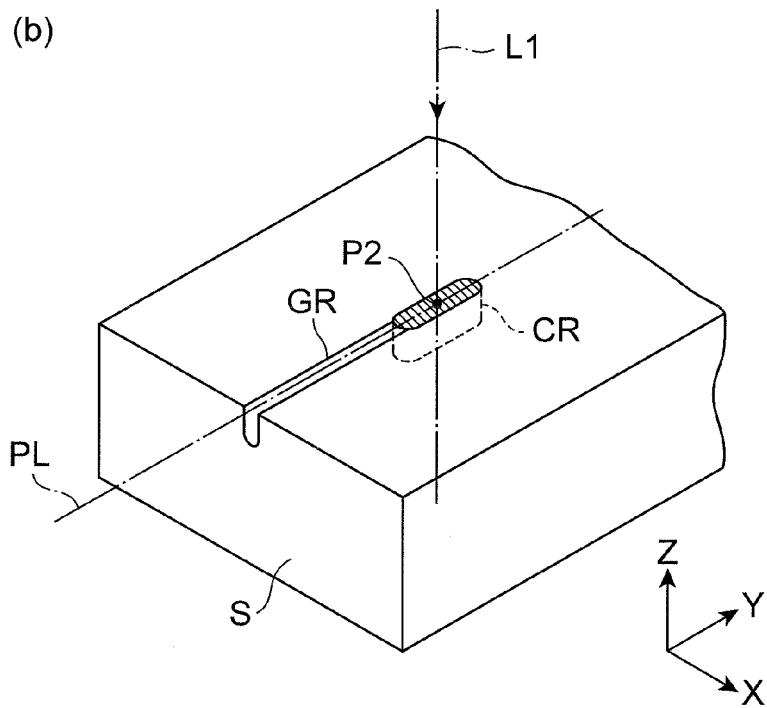

An example of operations of the above-mentioned laser beam working machine 1 will now be explained. FIG. 5 is a view illustrating a work in which a working area is formed by the laser beam working machine of FIG. 1. In this example, as illustrated in FIG. 5, the work S, which is a glass substrate, is irradiated with the laser beam L1, which is a pulsed wave, along a working line PL of the work S, so as to form a groove GR as a working area on the front face of the work S.

First, the XYZ stage 7 moves the support table 3 along the Z axis such that the second point P2 is located on the front face of the work S. The knife edges 13 adjust the divergence angle θ of the laser beam L1 incident on the objective lens 5, thereby regulating the maximum length W in the Y-axis direction of the cross-sectional form of the laser beam L1 at the second point P2. While the position of the first point P1 with respect to the work S can be adjusted by moving the cylindrical lens 4, it is not necessary for the position of the first point P1 to be adjusted with respect to the work S here, since the work S is adapted to absorb the laser beam L1 so that the laser beam L1 is absorbed by the front face of the work S at which the point P2 is located.

Subsequently, the laser oscillator 2 emits the laser beam L1 such that the peak power density of the laser beam L1 at the second point P2 located on the front face of the work S exceeds a working threshold (e.g., a threshold at which ablation can occur), while the XYZ stage 7 moves the support table 3 along the Y axis, whereby the working line PL is irradiated with the laser beam L1. This forms one crack region CR for each pulse of irradiation with the laser beam L1 in a portion where the point P2 is located on the front face of the work S, while making a plurality of crack regions CR continuous with each other, thereby producing the groove GR on the front face of the work S along the working line PL. Here, since the laser beam L1 has an elongated cross-sectional form extending in the Y-axis direction at the point P2, each crack region CR has an elongated form extending along the working line PL as seen in the direction in which the laser beam L1 is incident on the work S. Since the divergence angle θ of the laser beam L1 incident on the objective lens 5 is adjusted by the knife edges 13, so as to regulate the maximum length W in the Y-axis direction of the cross-sectional form of the laser beam L1 at the second point P2, the maximum length of the crack region CR along the working line PL becomes longer and shorter when the divergence angle θ is greater and smaller (see FIGS. 5(a) and 5(b)), respectively.

As explained in the foregoing, while the cross section of the laser beam L1 becomes elongated forms extending in the X- and Y-axis directions at the first and second points P1, P2, respectively, the divergence angle θ of the laser beam L1 incident on the objective lens 5 is adjusted by the knife edges 13, so as to regulate the maximum length W in the Y-axis direction of the cross-sectional form of the laser beam L1 at the second point P2 in the laser beam working machine 1. Therefore, when the XYZ stage 7 positions the point P2 on the front face of the work S, an elongated working area extending in the Y-axis direction by a desirable length can be formed in a portion where the point P2 is located on the front face of the work S. Hence, the laser beam working machine 1 can form a working area into a desirable shape.

In the laser beam working machine 1, the XYZ stage 7 moves the support table 3 relative to the objective lens 5 in the Y-axis direction. In this case, since the working area becomes an elongated form extending in the Y-axis direction, a working area can efficiently be formed within the work S along the working line PL parallel to the Y axis. When the XYZ stage 7 moves the support table 3 relative to the objective lens 5 in the X-axis direction, a wide working area can be formed within the work S along the working line PL parallel to the X axis, since the working area becomes an elongated form extending in the Y-axis direction.

In the laser beam working machine 1, the dichroic mirror 11 adapted to reflect the laser beam L1 and transmit the observation beam L2 therethrough is disposed on the optical axis between the cylindrical lens 4 and objective lens 5. As a consequence, the front face, inside, or rear face of the work S can be observed through the objective lens 5 having a function to converge parallel light into one point on the optical axis without being affected by the cylindrical lens 4.

Figure 6:
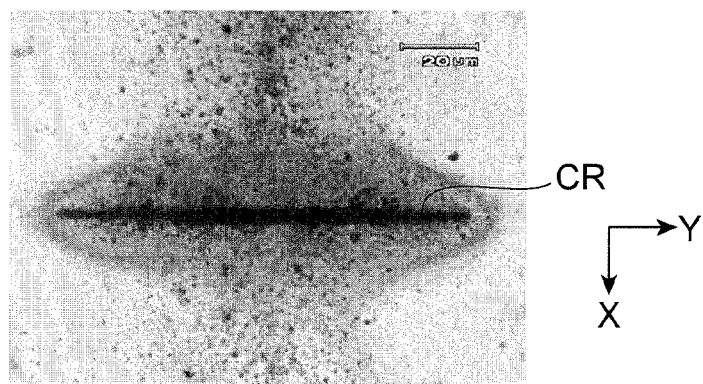
[FIG. 6] is a view illustrating photographs of a work formed with crack regions by examples of the laser beam working machine in accordance with the present invention.
Figure 6:
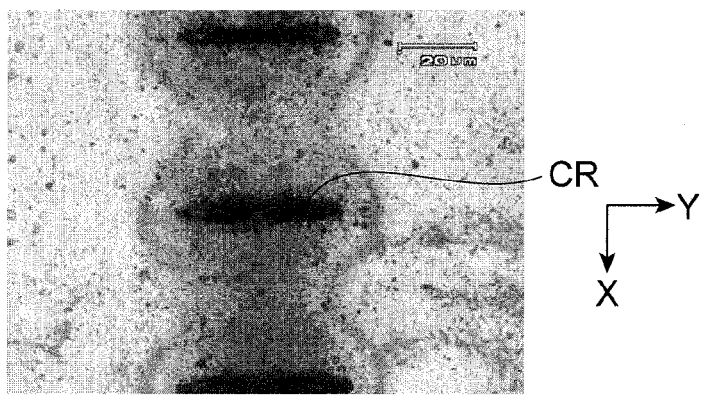
Figure 6:
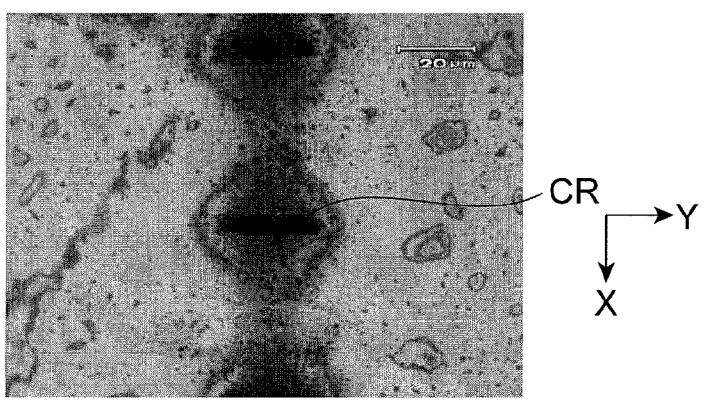
Figure 7:
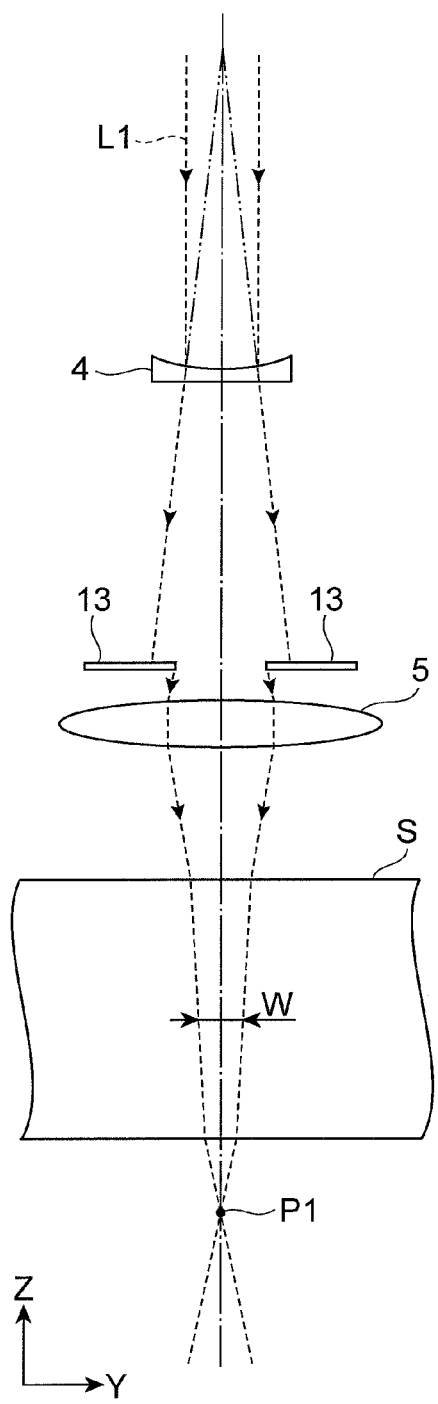
[FIG. 7] is a diagram illustrating the optical path of the laser beam in another embodiment of the laser beam working machine in accordance with the present invention.
Figure 7:
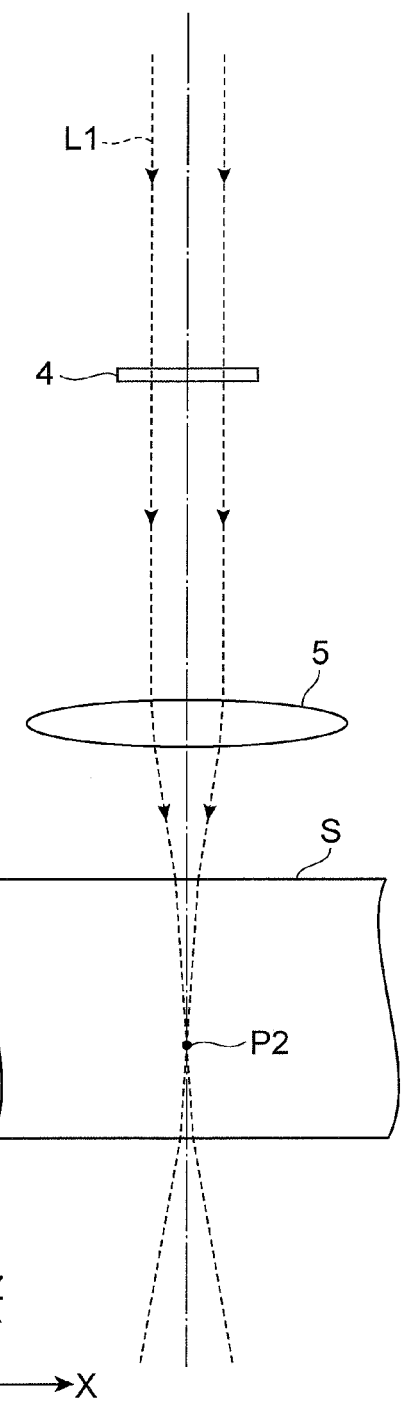

Examples of the laser beam working machine in accordance with the present invention will now be explained. FIG. 6 is a view illustrating photographs of a work formed with crack regions by the examples of the laser beam working machine in accordance with the present invention. In FIG. 6, (a) is a photograph of a crack region formed on the front face of the work when the slit width between the knife edges is 3.96 mm, (b) is a photograph of a crack region formed on the front face of the work when the slit width between the knife edges is 2.88 mm, and (c) is a photograph of a crack region formed on the front face of the work when the slit width between the knife edges is 0.72 mm.

The following are working conditions in the examples:
(A) Work: Pyrex (registered trademark) glass (having a thickness of 700 μm)
(B) Laser
Light source: Yb:KGW ultrashort pulse laser
Wavelength: 1030 nm
Oscillation mode: mode locking/regenerative amplification
Repetition frequency: 3 kHz
Pulse width: 3 ps
Emission laser energy: 100 μJ/pulse
Emission laser beam quality: $TEM_{00}$
Polarization characteristic: linear polarization
(C) Objective Lens
Numerical aperture (NA): 0.55
Transmittance for the laser beam: 70%

(D) Irradiation Condition.
Cross-sectional form of laser beam at the second point P2: 100 μm (maximum length in the Y-axis direction)×5 μm (maximum length in the X-axis direction)
Cross-sectional area of laser beam at the second point P2: $5 \times 10^{-6}$ cm$^2$
Peak power density of laser beam at the second point P2: $5.1 \times 10^{12}$ W/cm$^2$
(E) Moving rate of the support table with respect to the objective lens: 300 mm/s As FIGS. 6(a) to 6(c) illustrate, the maximum length of the crack region CR along the working line PL becomes longer and shorter when the slit width between the knife edges is longer and shorter so that the divergence angle θ of the laser beam L1 is greater and smaller, respectively.

The present invention is not limited to the above-mentioned embodiment.

For example, when the work S is transparent to the laser beam L1, the work S may be irradiated with the laser beam L1 while the moving mechanism 6 and XYZ stage 7 locate the first and second points P1, P2 on the outside of the work S and on the outer surface (e.g., front face or rear face) of the work S or therewithin, respectively.

In this case, when a crack region CR to become a cutting start point is formed within the work S along the working line PL parallel to the Y axis, the work S can accurately be cut along the working line PL. Since the crack region CR becomes an elongated form extending along the working line PL, the cut section of the work S cut along the working line PL can be made smooth as well.

In place of or together with a pair of knife edges 13 adapted to advance and retract with respect to the optical axis of the objective lens 5 from both sides thereof along the Y axis, a pair of knife edges adapted to advance and retract with respect to the optical axis of the objective lens 5 from both sides thereof along the X axis or a stop member having a light-transmitting aperture having a circular cross section or the like may be employed.

Figure 8:
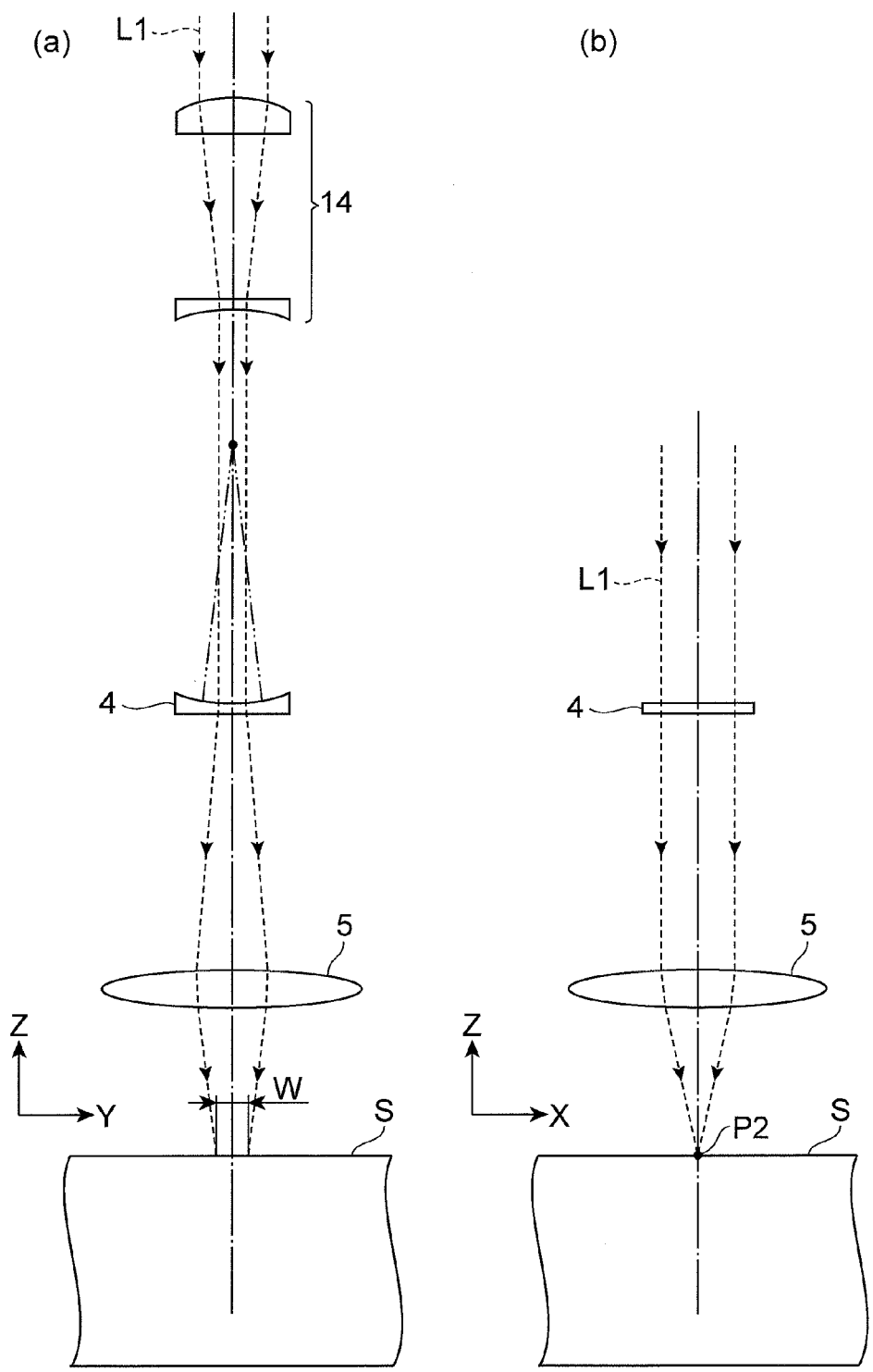
[FIG. 8] is a diagram illustrating the optical path of the laser beam in still another embodiment of the laser beam working machine in accordance with the present invention.

As illustrated in FIG. 8, a compression lens system (adjustment mechanism) 14 which compresses the diameter of the laser beam L1 in the Y-axis direction may be employed on the optical axis between the laser oscillator 2 and cylindrical lens 4 in place of the knife edges 13. Changing the diameter of the laser beam L1 in the Y-axis direction by the compression lens system 14 can adjust the divergence angle θ of the laser beam L1 incident on the objective lens 5, thereby regulating the maximum length in the Y-axis direction of the cross-sectional form of the laser beam L1 at the second point P2.

In place of or together with the moving mechanism 6, one which can move the cylindrical lens 4 relative to the objective lens 5 along the optical axis by moving the objective lens 5 or both of the cylindrical lens 4 and objective lens 5, for example, may be employed. Similarly, in place of or together with the XYZ stage 7, one which can move the support table 3 relative to the objective lens 5 along the optical axis by moving the objective lens 5 (or the laser beam irradiation device 10 including the objective lens 5) or both of the support table 3 and objective lens 5 (or laser beam irradiation device 10 including the objective lens 5), for example, may be employed.

In place of the cylindrical lens 4, other optical systems such as one constituted by a plurality of lenses may be employed as long as they have a function to diverge or converge parallel light in a predetermined direction orthogonal to the optical axis. Similarly, in place of the objective lens 5, other optical systems such as one constituted by a plurality of lenses may be employed as long as they have a function to converge parallel light into one point on the optical axis. When an optical system such as a cylindrical lens having a function to converge parallel light in a predetermined direction orthogonal to the optical axis by a cylindrical convex surface is employed, so as to make a convergent beam incident on the objective lens 5, the convergence angle of the laser beam L1 incident on the objective lens 5 may be adjusted.

The use of the crack regions is not limited to serving as a cutting start point. Examples of the other uses include optical waveguides, micro-flow paths, and micro-TAS (Total Analysis Systems) constructed by a plurality of continuous crack regions.

The working area is not limited to the crack regions. Examples of the working area include not only the crack regions and dielectric breakdown regions (e.g., when the work is made of glass or a piezoelectric material such as LiTaO$_3$), but also molten processed regions (e.g., when the work is made of a semiconductor material such as silicon), refractive index changed regions (e.g., when the work is made of glass), and their mixed regions.

Industrial Applicability

The present invention can provide a laser beam working machine which can form a working area into a desirable shape.

Reference Signs List

1 . . . laser beam working machine; 2 . . . laser oscillator (laser light source), 3 . . . support table; 4 . . . cylindrical lens (first optical system); 5 . . . objective lens (second optical system); 7 . . . XYZ stage (moving mechanism); 11 . . . dichroic mirror (optical member); 13 . . . knife edge (adjustment mechanism); 14 . . . compression lens system (adjustment mechanism)

The invention claimed is:

1. A laser beam working machine comprising:
   a laser light source for emitting a laser beam;
   a support table for supporting a work;
   a first optical system, having a function to diverge or converge parallel light in a predetermined direction orthogonal to an optical axis, for diverging or converging the laser beam emitted from the laser light source in the predetermined direction;
   a second optical system, having a function to converge parallel light into one point on the optical axis, for converging the laser beam emitted from the first optical system into a first point in a first direction orthogonal to the optical axis and a second point in a second direction orthogonal to the optical axis and first direction;
   an adjustment mechanism for adjusting a divergence or convergence angle of the laser beam incident on the second optical system at least in the first direction; and
   a moving mechanism for moving the support table relative to the second optical system along the optical axis such that at least the second point is located on an outer surface of the work or therewithin,
   wherein a cross section of the laser beam at the first point becomes an elongated form in the second direction, and a cross section of the laser beam at the second point becomes an elongated form in the first direction.

2. A laser beam working machine according to claim 1, wherein, when the work is adapted to absorb the laser beam, the moving mechanism moves the support table relative to the second optical system along the optical axis such that the second point is located on the outer surface of the work.

3. A laser beam working machine according to claim 1, wherein, when the work is adapted to transmit the laser beam therethrough, the moving mechanism moves the support table relative to the second optical system along the optical axis such that the first and second points are located on the outside of the work and on the outer surface of the work or therewithin, respectively.

4. A laser beam working machine according to claim 1, wherein the moving mechanism moves the support table relative to the second optical system in the first direction.

5. A laser beam working machine according to claim 1, wherein the moving mechanism moves the support table relative to the second optical system in the second direction.

6. A laser beam working machine according to claim 1, wherein an optical member reflecting the laser beam is disposed on the optical axis between the first and second optical systems; and wherein the optical member transmits therethrough an observation beam for observing the work.

7. A laser beam working machine according to claim 1, wherein the adjustment mechanism is a slit for changing a width of the laser beam in the first direction by varying a gap in the first direction on an optical path between the first and second optical systems.

8. A laser beam working machine according to claim 1, wherein the adjustment mechanism is an optical system for changing the width of the laser beam in the first direction on an optical path between the laser light source and first optical system.

* * * * *